United States Patent [19]

Kumazawa et al.

[11] Patent Number: 4,703,242
[45] Date of Patent: Oct. 27, 1987

[54] CONTROL METHOD AND APPARATUS FOR POSITIONING SERVO SYSTEM

[75] Inventors: Kiyotake Kumazawa, Tokyo; Noriaki Minamide, Odawara; Yoshihiro Moribe, Chigasaki; Mikio Takahashi, Odawara; Osamu Beppu, Odawara; Masahiro Mitamura, Odawara, all of Japan

[73] Assignee: Hitachi, Ltd., Tokyo, Japan

[21] Appl. No.: 9,072

[22] Filed: Jan. 27, 1987

Related U.S. Application Data

[63] Continuation of Ser. No. 766,804, Aug. 19, 1985, abandoned.

[30] Foreign Application Priority Data

Sep. 29, 1984 [JP] Japan .................................. 59-205316
Apr. 3, 1985 [JP] Japan .................................. 60-68942

[51] Int. Cl.$^4$ ............................................. G05B 19/40
[52] U.S. Cl. .................................... 318/685; 318/696; 360/78
[58] Field of Search ................... 318/685, 696; 360/78

[56] References Cited

U.S. PATENT DOCUMENTS 4,437,049  3/1984  Tullos et al. ................... 318/696
4,489,259  12/1984 White et al. .................... 318/696
4,490,662  12/1984 Moribe et al. .................. 318/685

Primary Examiner—William M. Shoop, Jr.
Assistant Examiner—Saul M. Bergmann
Attorney, Agent, or Firm—Antonelli, Terry & Wands

[57] ABSTRACT

A magnetic disc head positioning system using a stepper motor eliminates positioning errors due to different approach directions and distances to a target track position through a drive control of temporarily stopping the head at a position immediately preceding or following the target track depending on the approach direction and, thereafter, moving the head from this position to the target track with a constant transient response. The head is brought to the temporary stop position by utilizing the overshooting response of the stepper motor so as to minimize the positioning time.

20 Claims, 10 Drawing Figures

CONTROL METHOD AND APPARATUS FOR POSITIONING SERVO SYSTEM

The application is a continuation of application Ser. No. 766,804, filed Aug. 19, 1985.

BACKGROUND OF THE INVENTION

The present invention relates to a positioning system and, particularly, to a control method and apparatus for a fast and accurate positioning system using a stepper motor. More particularly, this invention relates to a control method and apparatus for positioning a magnetic head to a target track on a magnetic recording disc or floppy disc accurately and rapidly by employment of a stepper motor.

Many of modern compact magnetic disc drive units and floppy disc drive units employ a stepper motor in their head positioning system. The stepper motor positioning system is less expensive than the positioning system using a voice coil motor, while on the other hand its head positioning accuracy is inferior due to variation in characteristics such as hysteresis of the stepper motor, making it difficult to increase the track density of the recording disc.

The applicant of this invention noticed that the aforementioned variation in such characteristics as hysteresis are closely related to the assembling accuracy of the stepper motor stator poles, and proposed a head positioning system removing the positioning error by positioning the head by driving the stepper motor by an integral multiple of the number of the stationary windings. (Refer to U.S. Pat. No. 4,490,662.) Although this technique alleviates the positioning error successfully, the time length needed for each positioning operation is left unconsidered. Reference may also be made to U.S. Pat. No. 4,489,259 by White et al.

SUMMARY OF THE INVENTION

One object of this invention is to provide a control method and apparatus for a high accuracy positioning system using a stepper motor.

Another object of this invention is to provide a control method and apparatus for an accurate and fast head positioning system using a stepper motor for a magnetic disc or floppy disc drive unit.

Still another object of this invention is to provide a control method and apparatus for a head positioning system for a magnetic disc or floppy disc drive unit operable in high track-density recording.

In order to achieve the above objectives, according to one aspect of the invention, the invention features that when a driven member is intended to move from a first stop position to a second stop position, it is moved and stopped temporarily at a third stop position located immediately preceding the second stop position and, thereafter, moved from the third stop position to the second stop position.

According to another aspect of the present invention, the invention features that when a driven member is intended to move from a fourth stop position to the second stop position, the fourth stop position being located oppositely to the first stop position with respect to the second stop position, it is moved from the fourth stop position beyond the second stop position and stopped temporarily at a fifth stop position and, thereafter, moved back to the second stop position.

According to still another aspect of the present invention, the invention features that the driven member is stopped temporarily utilizing an overshooting response of a stepper motor.

According to still another aspect of the present invention, the invention features that the driven member is a magnetic head of a magnetic recording apparatus and the above-mentioned first and second stop positions are located on recording tracks provided concentrically on a magnetic recording disc.

DESCRIPTION OF THE PREFERRED EMBODIMENTS

Figure 1:
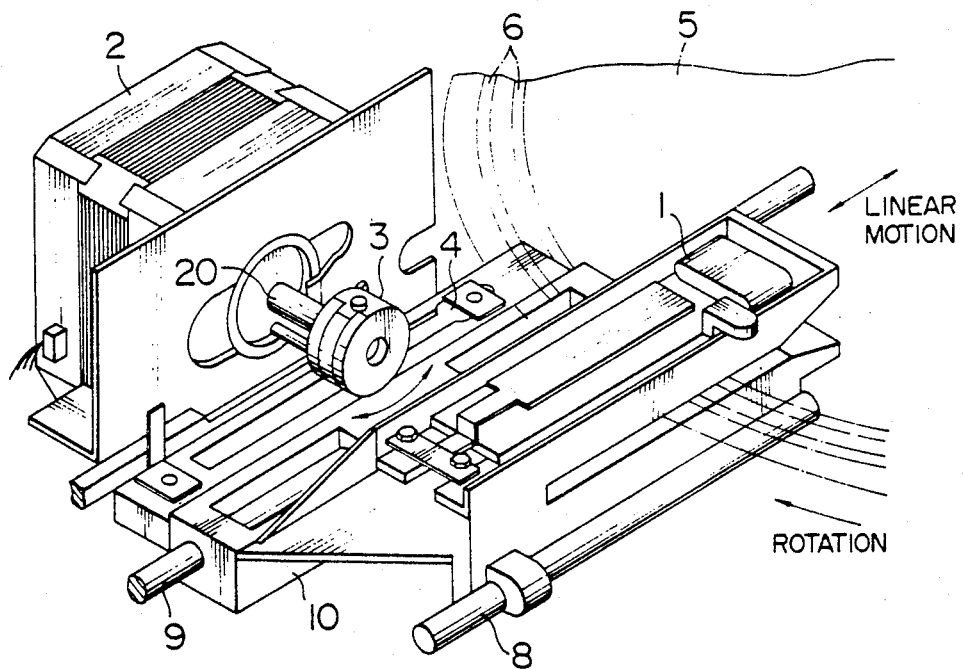
FIG. 1 is a perspective view of the floppy disc head positioning mechanism to which this invention is applied.

The magnetic recording disc or floppy disc head positioning mechanism shown in FIG. 1 includes a stepper motor 2 having a drive shaft 20 with a pulley 3 fixed thereon, a carriage 10, movable along two guide arms or rails 8 and 9 extending toward the center of a magnetic recording disc 5, for supporting a magnetic head 1, and a steel belt 4 having its both ends fixed on the carriage 10 and its central section wound around the pulley 3. This mechanism is intended to move the carriage 10 along the guide rails 8 and 9 by operating the stepper motor 2 to apply the tension to the steel belt 4 through the driving pulley 3. Namely, the rotational angle of the stepper motor 2 is converted to the linear motion of the carriage 10 through the steel belt 4, so that the magnetic head 1 is positioned to an arbitrary track on the recording disc 5. Thus, the pulley 3, steel belt 4, guide rails 8 and 9, and carriage 10 in combination constitute a motion transfer mechanism. However, it should be noted that the inventive positioning system is applicable not only to the mechanism shown in FIG. 1, but also to mechanisms in which a magnetic head is turned using a wound belt, or mechanisms using a looped steel belt.

Figure 2:
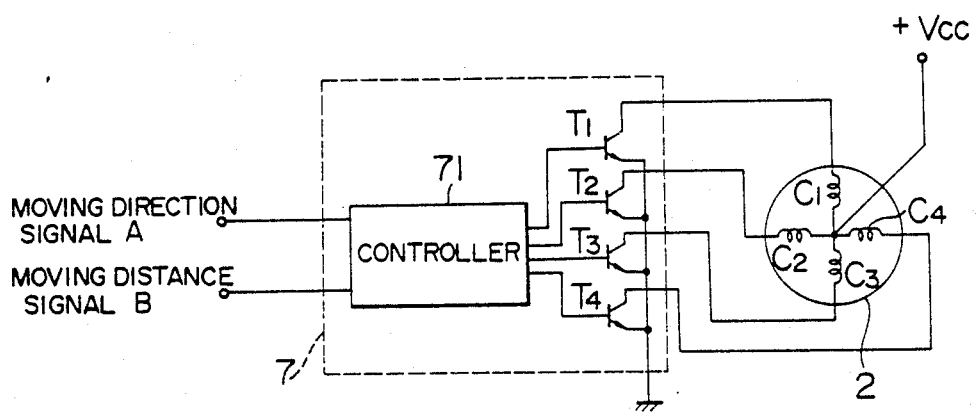
FIG. 2 is a schematic diagram of the head drive circuit used to operate the head positioning mechanism shown in FIG. 1.

With reference to FIG. 2, the stepper motor 2 has four stator windings C1-C4 as shown in the figure, the rotational axis or the shaft of the motor 2 rotates by energizing two adjacent windings sequentially through corresponding transistors (T1-T4) in the drive circuit 7 as shown in FIG. 2, and is held to a stationary position by holding the energizing state of the windings C1-C4. The drive circuit 7 incorporates a controller 71 for timing the activation of the transistors T1-T4. The controller 71 receives the moving direction signal A (generally, a high-level or low-level signal) and moving distance signal B (generally, a train of pulses with the number of pulses being proportional to the moving distance), and activates or deactivates each of the transistors T1–T4 depending on these signals A and B to turn or hold the stepper motor 2.

Figure 3:
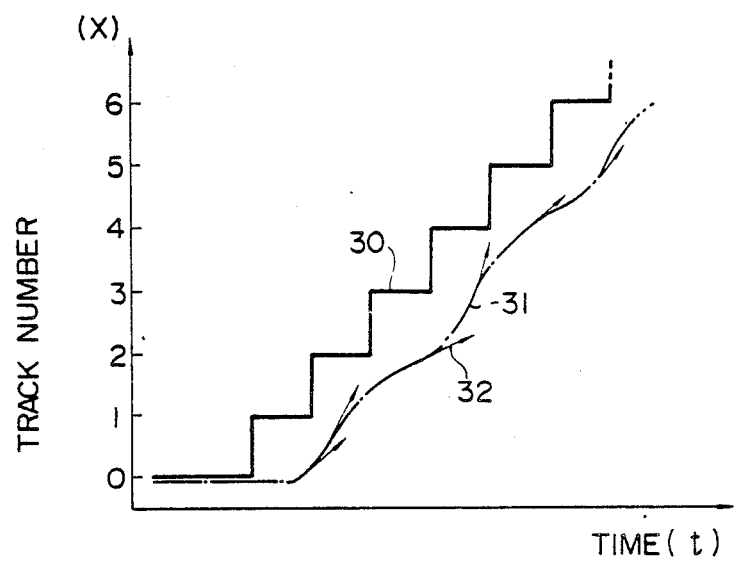
FIG. 3 is a timing chart showing the head positioning command issued to the head drive circuit shown in FIG. 2 and the actual movement of the head.

The head positioning command for driving the stepper motor by switching the transistors T1–T4 at certain time intervals is a signal which changes in a staircase-like manner when shown on a graph with the track position plotted on the ordinate against time on the abscissa, as shown in FIG. 3.

Figure 4:
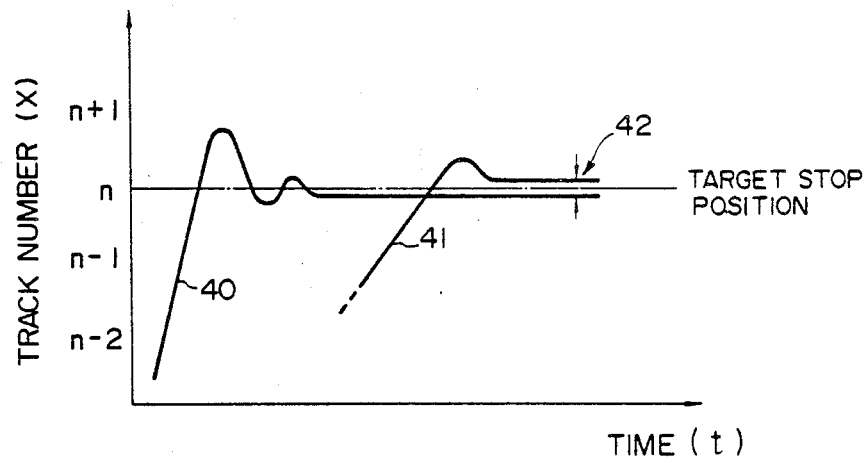
FIG. 4 is a timing chart used to explain the head positioning error caused by different target approach speeds.
Figure 5:
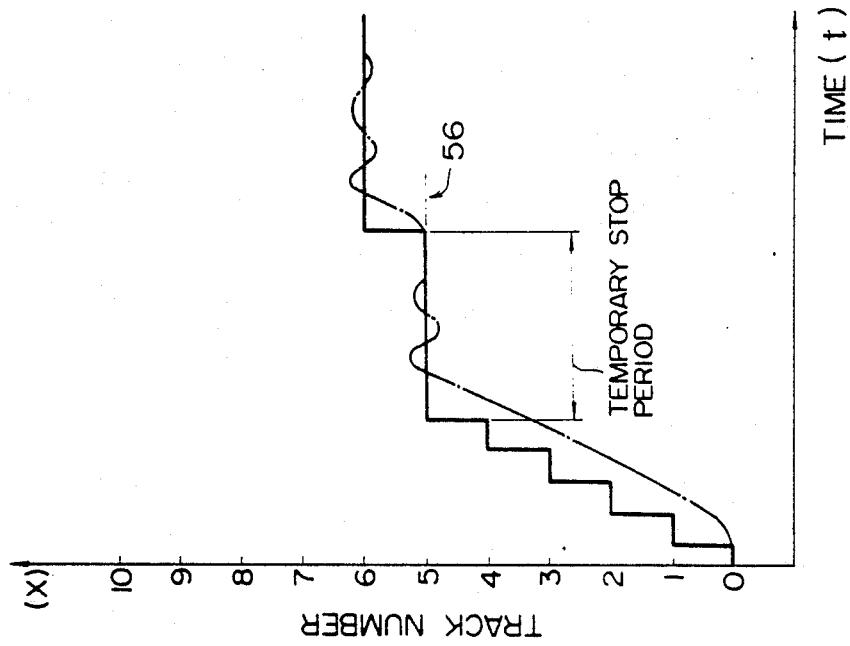
FIGS. 5 through 8 are timing charts used to explain the first embodiment of this invention in which the magnetic head is stopped temporarily at a stop position immediately before the target track.
Figure 6:
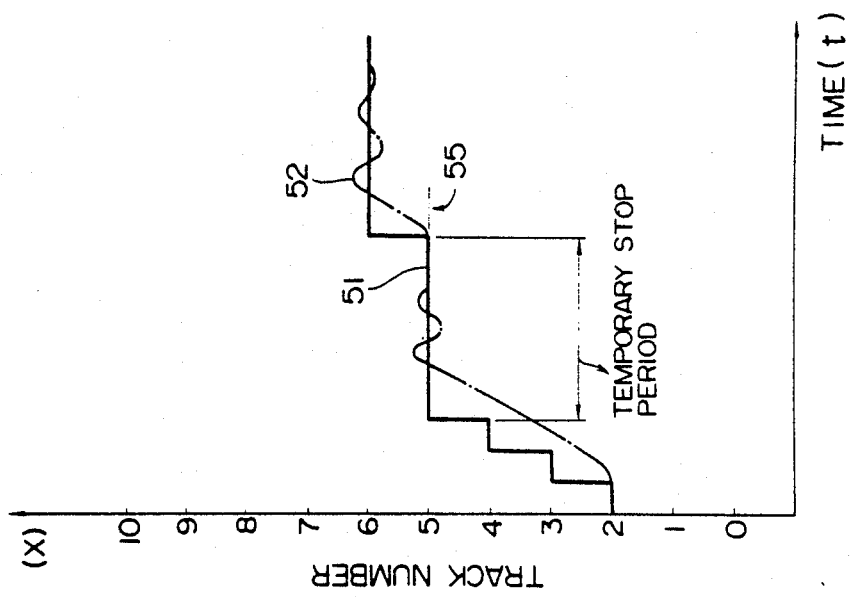

In FIG. 3, there are shown a staircase-like head positioning command (solid line) 30 which changes at certain time intervals from track number 0 on the recording disc, and the locus of actual head position (dot-and-dash line) 31. As will be apparent from the figure, due to a pulsative drive torque produced by the stepper motor 2 at each transition of the head positioning command 30, the head 1, in response to the head positioning command 30, moves along the path represented by the actual head position locus 31 with the oscillation characterized by the mass of moving members including the head 1 and the friction or viscosity between the carriage 10 and the guide rails 8 and 9. This means that the head moving speed (dX/dt) 32 shown by the arrows in the figure varies during the movement. A difference in the target approach speed, for example a higher speed 40 or lower speed 41 depending on the distance of movement in positioning to track n as shown in FIG. 4, causes a positioning error as shown by 42 in FIG. 4. According to this invention, this positioning error is eliminated in the following manner. In both cases of positioning the head from track 2 to track 6 at a lower target approach speed as shown in FIG. 5 and from track 0 to 6 at a higher target approach speed as shown in FIG. 6, the positioning command 51 (or 53) is extended until the head comes to a halt temporarily at a temporary stop position immediately before the target track, and then the head is moved from this position to the target track.

The reason why the positioning error can be eliminated may be explained as follows:

After moving the head to the target track, the head settles at the track after the damped oscillatory motion of the head ceases. The charcteristics of the oscillation motion or the response of the head after being driven by the stepper motor by a single step thereof is determined dependent upon such factors as the equivalent mass corresponding to the mass of the carriage 10 on which the magnetic head 1 is mounted and the moment of inertia of the rotor, the pulley 3 and the shaft 20 of the stepper motor all converted to an equivalent mass positioned at a point distant from the center of the pulley 3 by the distance of the radius of the pulley 3, the fluid frictional coefficient due to the lubricant between the carriage 10 and guide rails 8, 9, the solid frictional force between the carriage 10 and the guide rails 8, 9, the holding torque of the stepper motor 2 converted to an equivalent force located at a position distant from the pulley 3 by a distance of the radius of the pulley 3, the initial displacement of the mass (i.e. initial displacement of the carriage 10) and the initial velocity of the mass (i.e. the head). As should be readily appreciated, the mass, fluid frictional coefficient, solid frictional coefficient and the holding torque are completely identical between the cases of FIG. 5 and FIG. 6, and, since the head is substantially in a halt condition at the temporary stop position at track 5 or in the vicinity thereof before it is again driven to the target track (the track 6), the initial velocity and the initial displacement are also substantially identical between these cases. Thus, the response or the oscillation characteristics of the head becomes substantially identical between the cases of FIG. 5 and FIG. 6, providing a substantially identical final settlng position, and eliminating the positioning error.

Thus, in the above-mentioned head positioning system, when the magnetic head is to be moved from a given start track $n_0$ to a target $n_1$, it becomes possible to improve the head positioning accuracy by moving the head after once stopping the head temporarily at a stop position immediately preceding the target track (or a quiescent position immediately preceding the quiescent position corresponding to the target track of the stepper motor). Because, by doing so, head positioning always starts from the identical vibration settling state or halt condition. In this connection, in the case where another start track $n_2$ is in the opposite direction of the track $n_0$ with respect to the track $n_1$, it also becomes possible, for the same reason as above, to improve the head positioning accuracy by temporarily stopping the head at the above-mentioned stop position (or the quiescent position of the step motor) which is immediately preceding the target track (or the corresponding quiescent position of the stepper motor) and is in the direction of the track $n_0$ and then moving the head to the target track. Thus, it becomes possible to reduce the hysteresis phenomena encountered in head positioning and improve the reproducibility of head positioning regardless of the position of the start track on the disk 5. A more detailed explanation will be given with reference to FIGS. 7 and 8.

Figure 7:
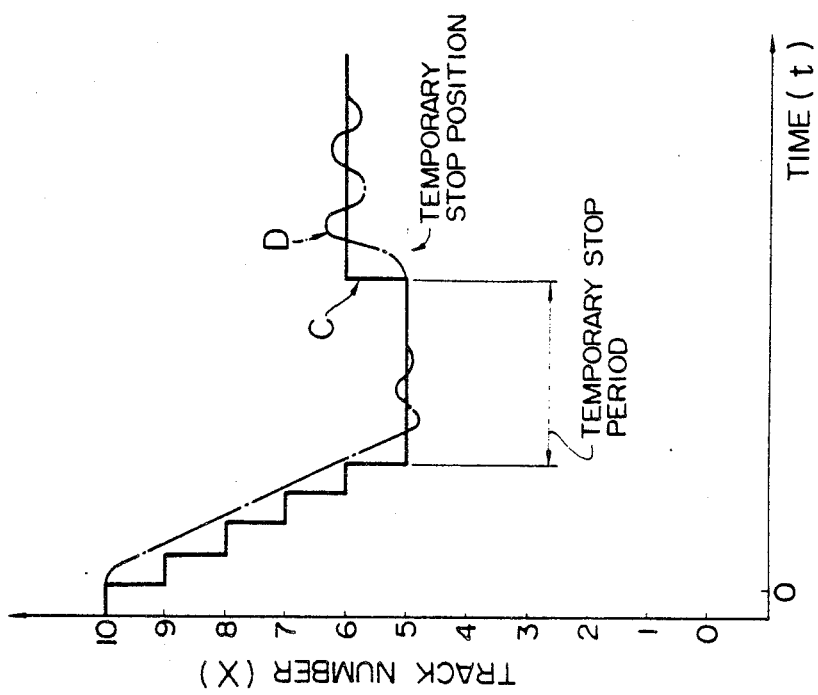
Figure 8:
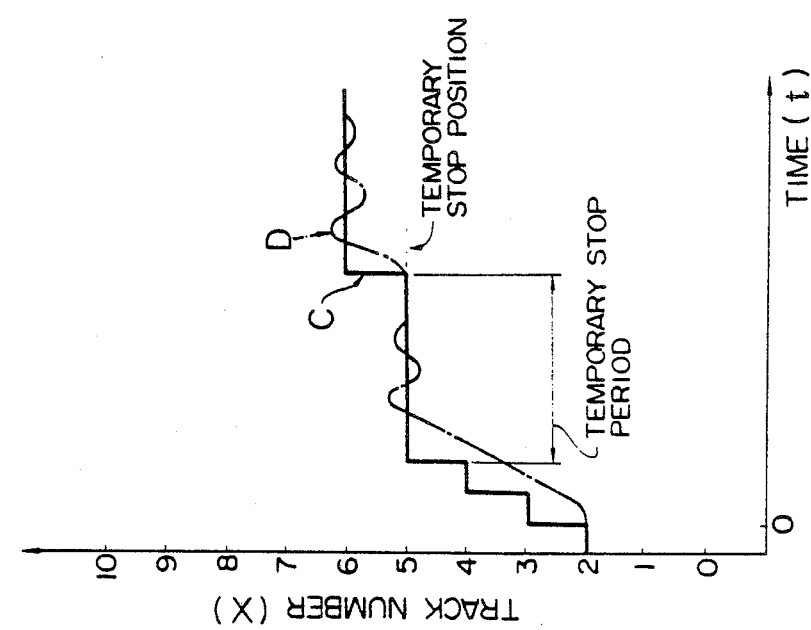

FIG. 8 shows another case of the head positioning command and response, in which the head is moved to the target track in the opposite direction. Namely, in positioning the head from track 10 to track 6, the head is moved and stopped at track 5 passing over the target track 6 by one stop position, and then moved back to the track 6. Accordingly, the final movement of the head from track 5 to track 6 is identical to the cases of FIGS. 5 and 6, and the positioning error which would be caused by the different target approach direction is eliminated as conveniently shown by comparison of two head moving directions in FIGS. 7 and 8.

The inventive head positioning system can readily be realized by manipulating the moving direction signal A and moving distance (number of tracks) signal B supplied to the stepper motor drive circuit 7 shown in FIG. 2. For example, for positioning the head from track 2 to track 6, as shown in FIG. 7, a high level for signal A and three pulses for signal B are issued, and when the head has reached track 5, the excitation of the windings of the stepper motor 2 is maintained as it is without supplying both of the signals A and B so as to hold the rotor in a stationary position. After the motor has been left for a certain time length in the stationary state, a high level for signal A and a pulse for signal B are issued so that the head is finally positioned from track 5 to track 6.

For the head positioning operation of FIG. 8, a low level for signal A and five pulses for signal B are issued so that the head is moved from track 10 to track 5, and after the head has been held stationary on track 5 for a certain time length, a high level for signal A and a pulse for signal B are issued so that the head is finally positioned from track 5 to track 6.

As the head positioning accuracy is improved for the repeated positioning operations, information can be recorded and retrieved at a higher track density.

Although in the above embodiment the head is stopped temporarily on a track immediately preceding or following the target track, it is also possible to provide further one or more temporary stop positions within the track pitch around the target track, whereby the positioning accuracy on the target track is further enhanced. However, the foregoing positioning procedures consume time during the temporary stop before the oscillatory movement of the head ceases if it is intended to achieve high accuracy positioning.

Figure 9:
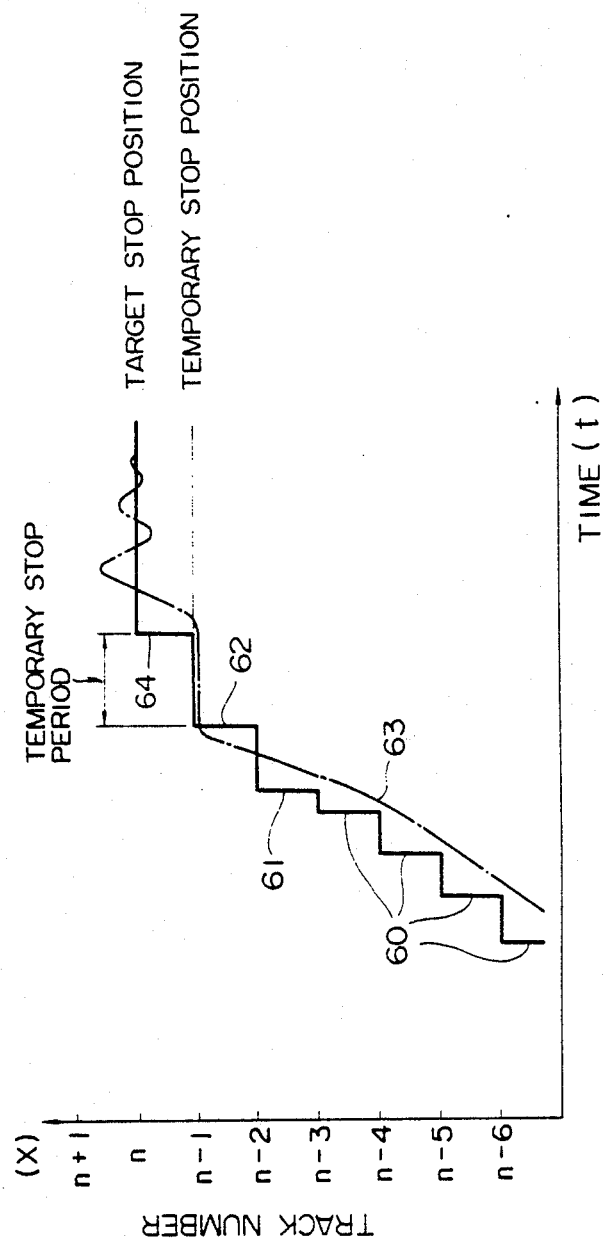
FIG. 9 is a timing chart used to explain the second embodiment of this invention in which the magnetic head is stopped temporarily with overshooting at a stop position immediately before the target track.

The following describes the second embodiment of this invention which accomplishes accurate and yet fast head positioning. In this method, when intended to position the head to track n as shown in FIG. 9, a normal-speed positioning command 60 is issued until the head reaches track n-3, from which position the command is switched to an increased-speed positioning command 61 by reducing the time interval between pulses so that the head is accelerated to overshoot track n-2, and then a holding command 62 is issued when the head has reached the temporary stop position n-1. After being stationary on track n-1 for a decreased time length, the head is brought to the final settling position in the same manner as in the previous embodiment.

Figure 10:
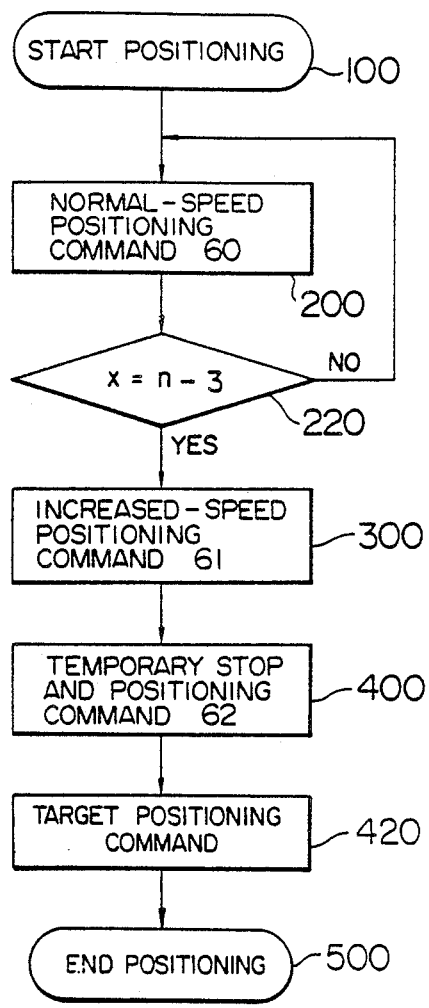
FIG. 10 is a flowchart showing the head positioning operation explained in FIG. 9.

The foregoing stepper motor drive control is accomplished by the controller 71 in the drive circuit 7 by implementing the sequential command issuance shown in FIG. 10, which includes a positioning start step 100, steps 200 and 220 of issuing a normal-speed positioning command 60 iteratively until the head reaches a track x preceding by three tracks from the target track, i.e., track n-3, a step 300 of issuing an increased-speed positioning command 61 by which the head overshoots by one track to reach track n-1, and a step 400 of issuing a temporary-stop and positioning command 62 by which the head is held on track n-1 for a time length, for example, twice the cycle time of the command 60 and then pulled in the target track at a unified speed by issuing a target position command 64 at step 420.

Although in the above embodiment the interval of positioning commands to bring the head to the temporary stop position is controlled to be short so that the head overshoots the temporary stop position in order to minimize the time length of temporary stoppage, it is also possible to achieve the purpose by issuing a positioning command for the step immediately before the temporary stop position so that the head overshoots until it reaches the temporary stop position.

The application voltage Vcc to the stepper motor windings may be lowered at a time point immediately before the head reaches the temporary stop position so that a swing back against the overshooting motion is reduced, or the positioning command immediately before the temporary stop position may be provided with an increased application voltage Vcc so as to increase the pull-in torque, or both of the above precedures may be employed together.

Although the head positioning system for a magnetic disc drive unit has been described, the inventive method can be applied to any positioning mechanism in which a moving member is driven by a pulsative driver.

According to this invention, as described above, when it is intended to position a moving member such as a magnetic head on a recording disc to a target position using a driver such as a stepper motor, the driven member is moved and temporarily stopped at a position immediately preceding or following the target position depending on the approach direction and then moved to the target position. Thus, it is possible to stop the driven member with a constant transient, response, whereby positioning is made with an improved reproducibility.

Moreover, with the use of a stepper motor as a driver for the inventive positioning system, a moving member is brought to a temporary stop position immediately preceding a target position by utilizing an overshooting response, whereby the positioning time to the temporary stop position can be minimized and thus a fast positioning operation can be accomplished.

Although in the embodiment of FIG. 9 the magnetic head is driven to track n-3 is accordance with the normal-speed positioning command 60, this invention is not limited to this operational scheme. Although in the above embodiment an increased-speed positioning command 61 is issued for the head movement from track n-3 to track n-2, this command may be issued more than once. The temporary stop position may be provided at a position between two contiguous tracks.

We claim:

1. A positioning control method for use in a positioning system wherein a stepper motor having a drdive shaft and a plurality of quiescent positions provides an output torque for a driven member so that said driven member is moved to any one of stop positions corresponding to said stepper motor quiescent positions, said stepper motor being controlled such that said driven member moves at a speed dependent upon a distance of movement of said driven member, said driven member exhibiting an oscillatory motion when it stops, said positioning control method comprising, when said driven member is to be moved from a first stop position to a second stop position:

a first step of rotating said drive shaft by an angular distance corresponding to a distanace between said first stop position and a third stop position which is located between said first and second stop positions and is adjacent to said second stop position;

a second step of maintaining said drive shaft at an angle corresonding to a quiescent position corresponding to said third stop position so that said driven member stops at said third position;

a third step of, after an oscillatory motion caused when said driven member is stopped at said third position is substantially completely settled, rotating said driven shaft by an angular distance corresponding to a distance between said third and second stop positions; and a fourth step of holding said drive shaft at an angular position corresponding to said second position so that said driven member is positioned at said second stop position.

2. A positioning control method according to claim 1, wherein said first step includes a step of controlling said stepper motor so as to increase the moving speed of said driven member at a stop position preceding said third stop position by two stop positions so that said driven member reaches said third position by an overshooting motion of said driven member.

3. A positioning control method according to claim 1, further comprising, when said driven member is to be moved from a fourth stop position to said second stop position, said fourth stop position being located oppositely to said first stop position with respect to said second stop position:
- a fifth step of rotating said drive shaft by an angular distance correspoding to a distance between said fourth stop position and a fifth stop position which is located between said first and second stop positions and is adjacent to said second position;
- a sixth step of holding said drive shaft at a quiescent position corresponding to said fifth stop position so that said driven member stops at said fifth stop position;
- a seventh step of, after an oscillatory motion caused when said driven member is stopped at said fifth stop position is substantially completely settled, rotating said drive shaft by an angular distance corresonding to a distance between said fifth and second stop positions; and
- an eighth step of holding said drive shaft at said second stop position so that said driven member is positioned at said second stop position.

4. A positioning control method according to claim 3, wherein said fifth step includes a step of controlling said stepper motor so as to increase the moving speed of said driven member at a stop position preceding said fifth stop position by two stop positions so that said driven member reaches said fifth stop position by an overshooting motion of said driven member.

5. A positioning control system comprising:
- a stepper motor having a drive shaft which rotates and stops at any one of a pluralilty of quiescent positions in response to a pulse signal;
- torque transmission means which transmits the output torque of said stepper motor to a driven member so that said driven member is moved; and
- control means which applies said pulse signal to said stepper motor so as to control the movement of said driven member through said torque transmission means, said control means controlling said pulse signal generation, when said driven member is intended to move from a first stop position to a second stop position, such that said driven member is moved from said first stop position to a third stop position immediately preceding said second stop position at a speed dependent upon a distance of movement of said driven member, is then stopped and held at said third stop position unitl an oscillatory motion of said driven member substantially completely settles, and is then moved from said third stop position to said second stop position, said oscillatory motion being caused when said driven member is stopped at said third position.

6. A positioning system according to claim 5, wherein said control means controls the pulse signal generation, when said driven member is intended to move from a fourth stop position to said second stop position, said fourth position being located oppositely to said first stop position, such that said driven member is moved from said fourth stop position beyond said second stop position toward a fifth stop position which is located between said first and second stop positions and is adjacent to said second stop position, said driven member moving at said driven member, aid driven member is then stopped and held at said fifth stop position until an oscillatory motion of said driven member substantially completely settles, and is then moved from said fifth stop position to said second stop position, said oscillatory motion being caused when said driven member is caused to stop at said fifth position.

7. A positioning method according to claim 1, wherein said driven member comprises a magnetic head for recording and retrieving information on a magnetic recording disc, said plurality of stop positions of said magnetic head being located on recording tracks provided concentrically on said recording disc.

8. A positioning method according to claim 1, wherein said driven member comprises a magnetic head for recording and retrieving information on a magnetic recording disc, said first and second stop positions being located on recording tracks provided concentrically on said recording disc, said third stop position being located between said recording tracks.

9. A positioning method according to claim 3, wherein said third stop position and said fifth stop position are identical.

10. A positioning method according to claim 9, wherein said driven member comprises a magnetic head for recording and retrieving information on a magnetic recording disc, said plurality of stop positions of said magnetic head being located on recording tracks provided concentrically on said recording disc.

11. A positioning method according to claim 9, wherein said driven member comprises a magnetic head for recording and retrieving information on a magnetic recording disc, said first, second and fourth stop positions being located on recording tracks provided concentrically on said recording disc, said third and fifth stop positions being located between recording tracks corresponding to said first and second stop positions.

12. A positioning method according to claim 3, wherein said driven member comprises a magnetic head for recording and retrieving information on a magnetic recording disc, said plurality of stop positions of said magnetic head being located on recording tracks provided concentrically on said recording disc.

13. A positioning method accordign to claim 3, wherein said driven member comprises a magnetic head for recording and retrieving information on a magnetic recording disc, said first, second and fourth stop positions being locatd on recording tracks provided concentrically on said recording disc, said third and fifth stop positions being located between recording tracks corresponding to said first and second stop positions.

14. A positioning system according to claim 6, wherein said third stop position and said fifth stop position are identical.

15. A positioning system according to claim 6, wherein said control means controls said pulse signal generation, when said driven member is intended to move from said fourth stop position to said fifth stop position, such that said driven member is accelerated to have an increased moving speed at a stop position preceding said fifth stop position by two stop positions and stopped at said fifth stop position by an overshooting motion of said driven member caused by said increased moving speed.

16. A positioning system according to claim 5, wherein said control means controls said pulse signal generation, when said driven member is intended to move from said first stop position to said third stop position, such that said driven member is accelerated to have an increased moving speed at a stop position preceding said third stop position by two stop positions and stopped at said third position by an overshooting motion of said driven member caused by said increasing moving speed.

17. A positioning system according to claim 5, wherein said driven member comprises a magnetic head for recording and retrieving information on a magnetic recording disc, said first, second and third stop positions being located on recording tracks provided concentrically on said recording on said recording disc.

18. A positioning system accordingto claim 5, wherein said driven member comprises a magnetic head for recording and retrieving information on a magnetic recording disc, said first and second stop positions being located on recording tracks provided concentrically on said recording disc, said third stop position being locating on a position between said tracks.

19. A positioning system according to claim 15, wherein said pulse signal comprises a train of pulses, and said control means controls said pulse signal generation to control a time interval between said pulses so as to enable an increased moving speed of said driven member by reducing the time interval between said pulses.

20. A positiong system according to claim 16, wherein said pulse signal comprises a train of pulses, and said control means controls said pulse signal generation to control a time interval between said pulses so as to enable an increased moving speed of said driven member by reducing the time interval between said pulses.

* * * * *